(12) United States Patent
Peterson et al.

(10) Patent No.: US 6,604,475 B2
(45) Date of Patent: Aug. 12, 2003

(54) DRIVE MECHANISM FOR SEED METERING DEVICE

(75) Inventors: Bruce D. Peterson, Lindsborg, KS (US); Brent W. Nelson, Falun, KS (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 0 days.

(21) Appl. No.: 10/033,124

(22) Filed: Oct. 22, 2001

(65) Prior Publication Data

US 2003/0075088 A1 Apr. 24, 2003

(51) Int. Cl.⁷ .............................. A01C 7/00; A01C 9/00
(52) U.S. Cl. ...................................................... 111/177
(58) Field of Search ................................ 111/177, 149, 111/157, 158, 160, 200, 926, 927, 14, 52, 69

(56) References Cited

U.S. PATENT DOCUMENTS

| | | | | |
|---|---|---|---|---|
| 3,598,069 A | * | 8/1971 | Hatcher et al. | 111/85 |
| 5,845,818 A | * | 12/1998 | Gregor et al. | 222/273 |
| 6,305,303 B1 | * | 10/2001 | Wright et al. | 111/100 |
| 6,308,645 B1 | | 10/2001 | Newkirk et al. | 111/63 |

* cited by examiner

*Primary Examiner*—Christopher J. Novosad
(74) *Attorney, Agent, or Firm*—Hovey Williams LLP

(57) ABSTRACT

Seeding apparatus has an opener mounted on the main frame in such a manner that the driven sprocket of a seed metering device on the opener moves slightly toward and away from the axis of the drive sprocket on the main frame as the opener moves up and down relative to the frame during changes in ground contour. To prevent the driving tight stretch of the drive chain between the drive sprocket and driven sprocket from undergoing significant length change during such movement of the opener relative to the frame, the tight stretch is trained around intermediate guide structure in such a manner that the different portions of the tight stretch thus defined all stay substantially constant in length at all times. An arrangement for use with a parallel linkage mounting of the opener has guides on the main frame and the opener that keep the chain portion spanning the frame and opener substantially parallel to the links of the linkage and of substantially the same length as such links. An alternative embodiment for use with a single pivot point-mounted opener positions the guide in the immediate vicinity of the pivot to maintain the spanning portion of the tight stretch between the guide and the driven sprocket substantially constant length at all times.

13 Claims, 3 Drawing Sheets

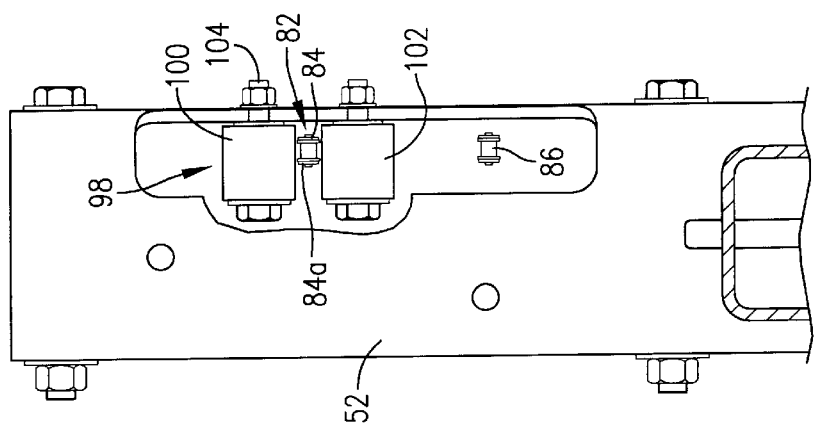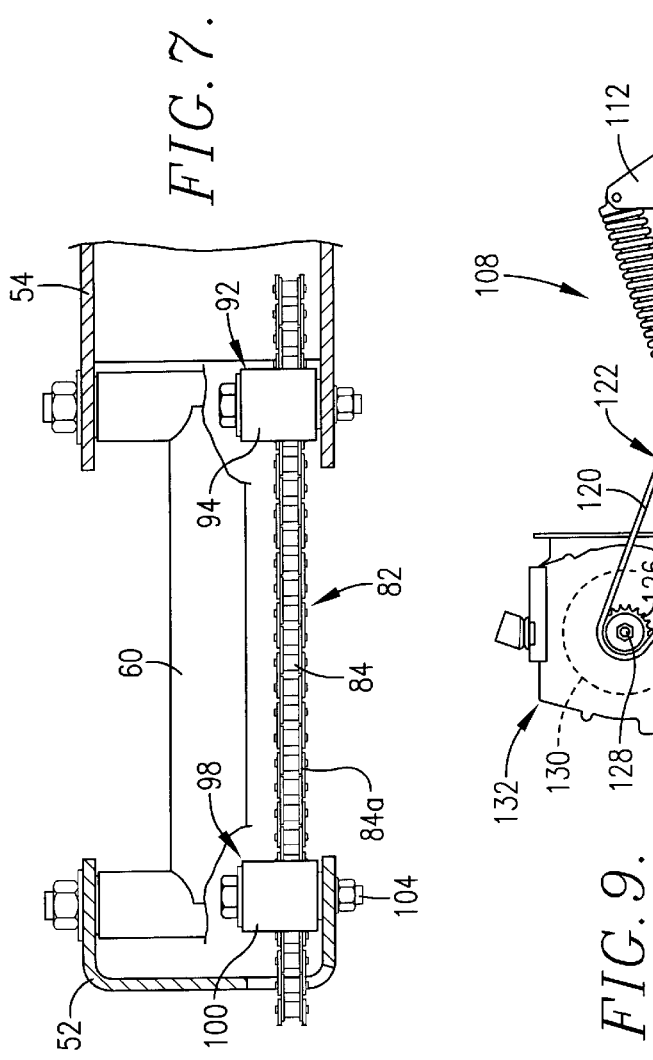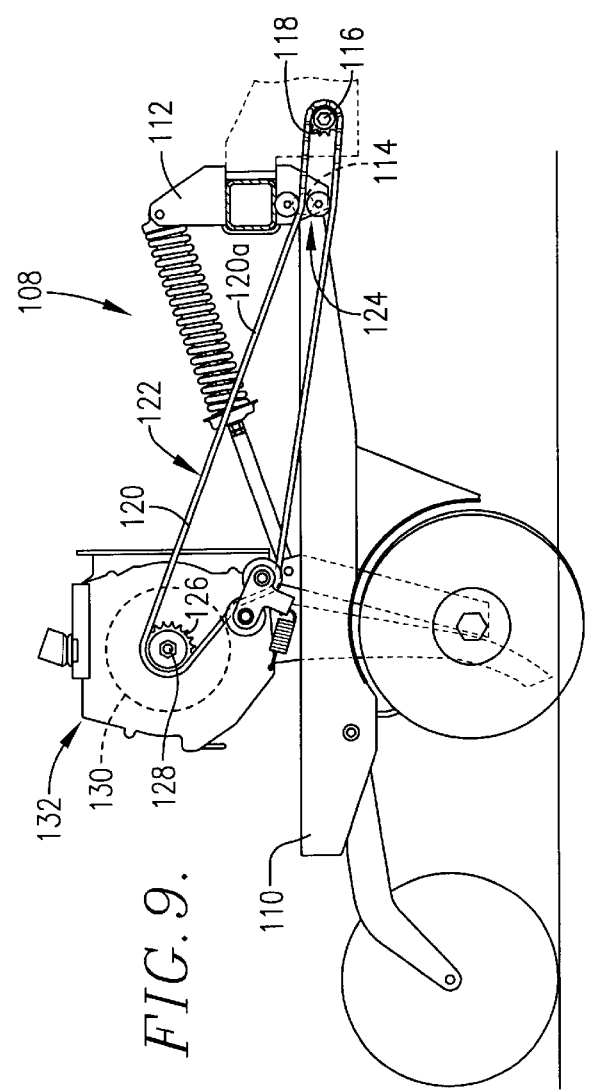

US 6,604,475 B2

DRIVE MECHANISM FOR SEED METERING DEVICE

TECHNICAL FIELD

This invention relates to the field of agricultural machinery and, more particularly, to improvements in seed planting machines.

BACKGROUND

Prior co-pending application Ser. No. 09/475,866 filed Dec. 30, 1999 and titled "Seeding Machine with Bulk Seed Supply Container and Independent, Opener-Mounted Metering Devices" assigned to the assignee of the present invention (now U.S. Pat. No. 6,308,645) discloses a machine in which each opener is provided with its own seed metering device mounted directly on the opener for support. Rather than each individual metering device having its own separate seed box, groupings of the devices are supplied with seed from a common overhead seed container. Each metering device has its own metering wheel that takes power from a common transverse drive shaft on the main frame of the machine, there being individual chain and sprocket assemblies leading from the common drive shaft back to the metering wheels of the meters. Rotation of the metering wheels causes the singulation and metered dispensing of seeds down to the ground as the machine advances.

Each opener is independently mounted on the main frame for up and down swinging movement as the opener encounters rises and falls in the terrain relative to the main frame. While such responsiveness is desirable, the location of the drive shaft at a distance from the axes of swinging movement of the openers causes a slight momentary change in the length of the tight side of the drive chain of each opener during relative movement of the opener. This is due to the fact that, as the opener swings up and down, it also moves slightly fore-and-aft, changing the center-to-center distance between the axis of the drive shaft and the axis of the driven shaft of the metering wheel. This slight change momentarily retards or advances the metering wheel, depending upon whether the opener is moving toward or away from its median operating position. Such speed change has the effect of slightly varying the rate at which the metering wheel drops its seeds, causing undesirable variations in the seed spacing in the furrow. In the prior arrangement, the metering wheel rotates relatively slowly and has a large number of seed pockets about its periphery. Thus, even a slight change in the angular velocity of the metering wheel can have a significant effect upon seed spacing.

SUMMARY OF THE INVENTION

The present invention provides a way of keeping the tight, driving stretch of the chain substantially the same length throughout all positions of the opener in spite of the fact that the center-to-center distance between the drive shaft on the main frame and the driven sprocket on the meter changes as the opener responds to variations in ground contour. Guides, preferably in the form of smooth, free-wheeling rollers, are engaged with the tight stretch at such locations that the critical portion spanning the frame and the opener swings about an axis located to cause no lengthening or shortening of the spanning portion as it moves with the opener. In one embodiment, wherein the opener is supported on the main frame through a parallel linkage, the guides are so located that the spanning portion of the tight stretch remains substantially parallel to the upper and lower links of the parallel linkage, while the remaining opposite end portions of the tight stretch, being located on the main frame and the opener respectively, undergo no swinging movement at all. One guide is disposed on the nonmoving main frame, while a second guide is disposed on the opener.

In another preferred embodiment where the opener has only a single pivot point connection with the main frame, rather than a parallel linkage, a single guide is used in close proximity to the pivot point. This causes the spanning portion of the tight stretch leading from the guide to the metering wheel to essentially swing about the same pivot point as the opener itself, maintaining the spanning portion at a constant length over the full range of relative movement of the opener.

BRIEF DESCRIPTION OF THE DRAWINGS

FIG. 7 is an enlarged, fragmentary horizontal cross sectional view through the apparatus illustrating the nature of the guide rollers and drive chain;

FIG. 8 is a fragmentary rear elevational view of a mounting plate on the opener illustrating the manner in which the tight side of the drive chain is trapped between guide rollers; and FIG. 9 illustrates an alternative embodiment of the invention in connection with an opener having a single pivot point mounting with the main frame of the machine.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
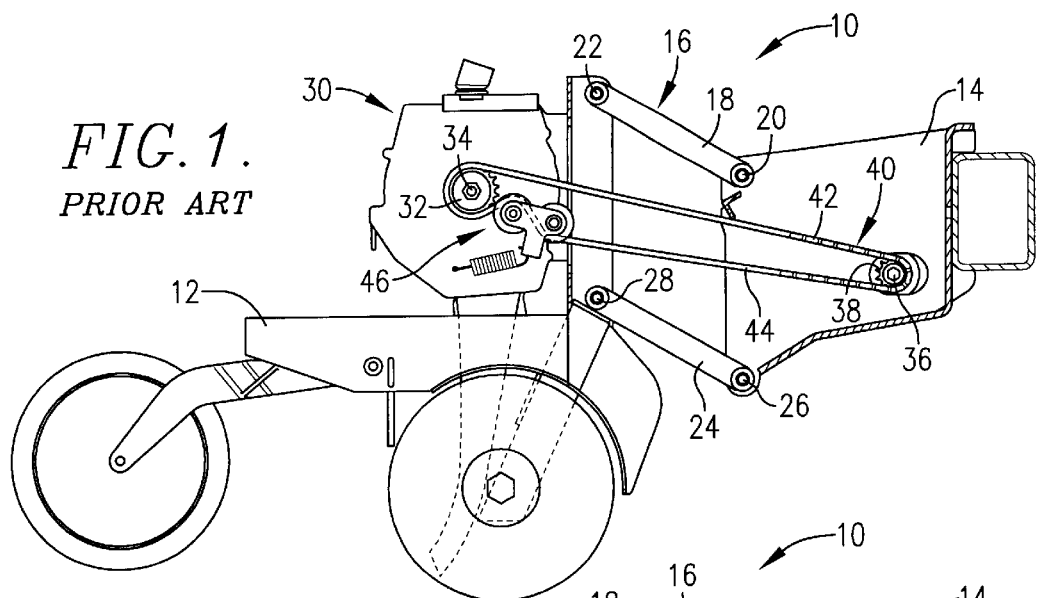
FIGS. 1–3 are schematic side elevational views of a prior art seeding machine illustrating how the tight side of the drive chain changes in length as the opener moves through its full range of up and down travel.
Figure 2:
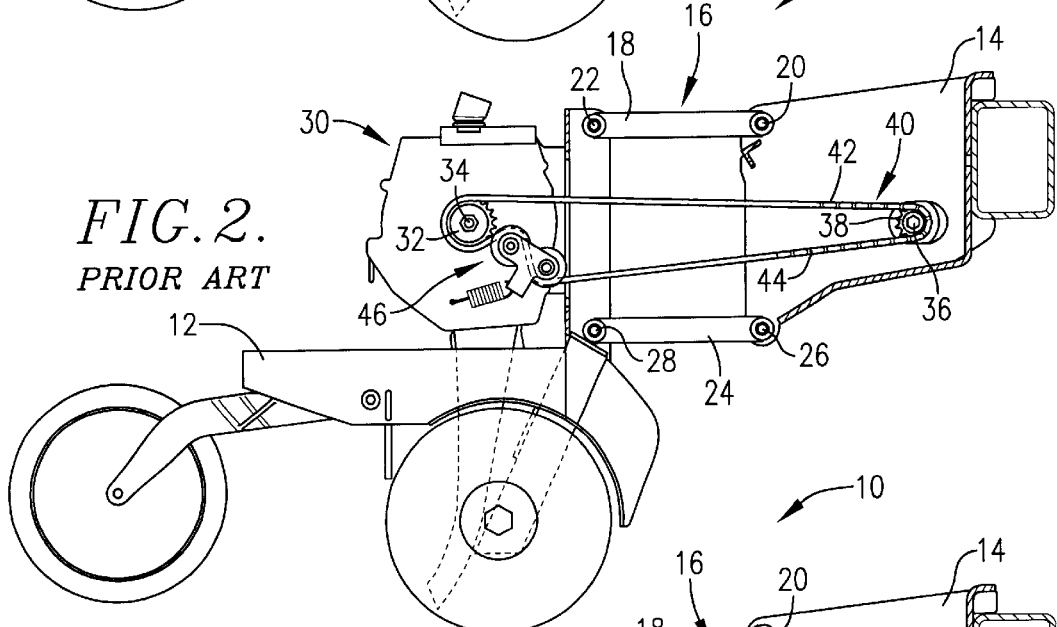
Figure 3:
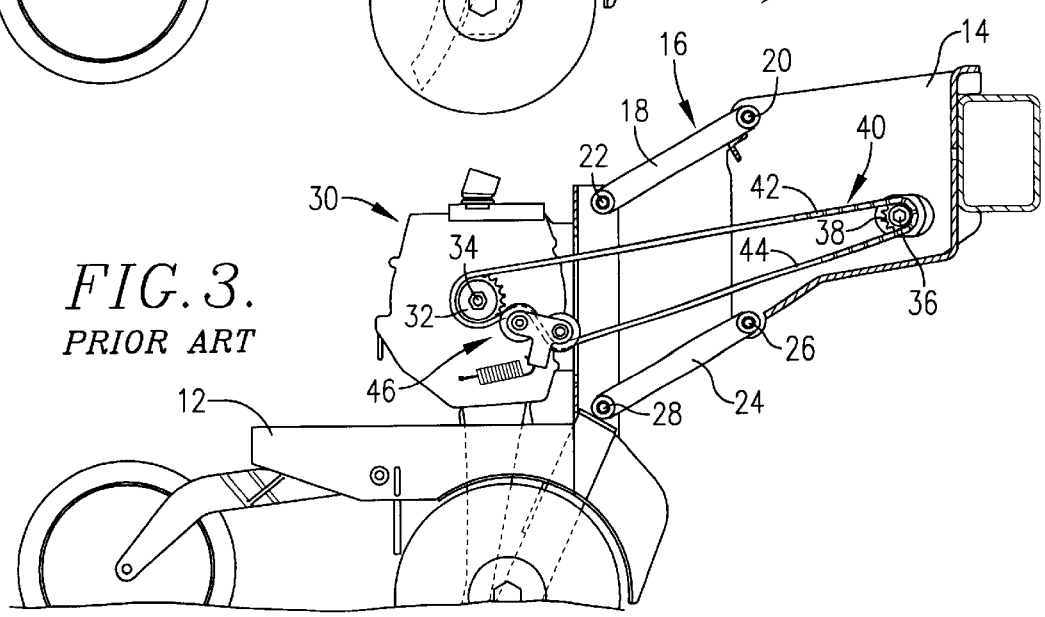
Figure 4:
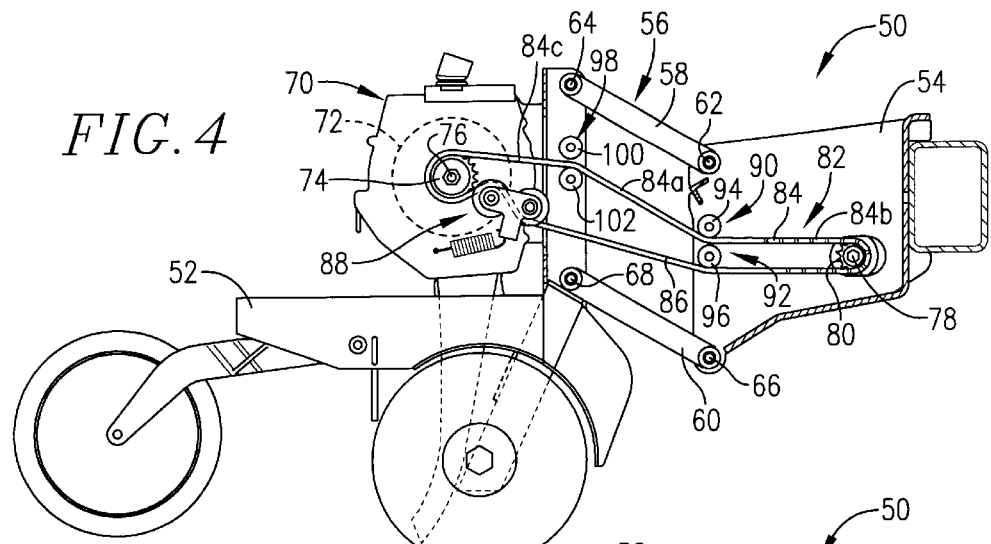
FIGS. 4–6 are similarly schematic side elevational views of one embodiment of a seeding machine incorporating the principles of the present invention and illustrating how the overall length of the tight side of the drive chain is maintained substantially constant throughout the range of travel of the opener.
Figure 5:
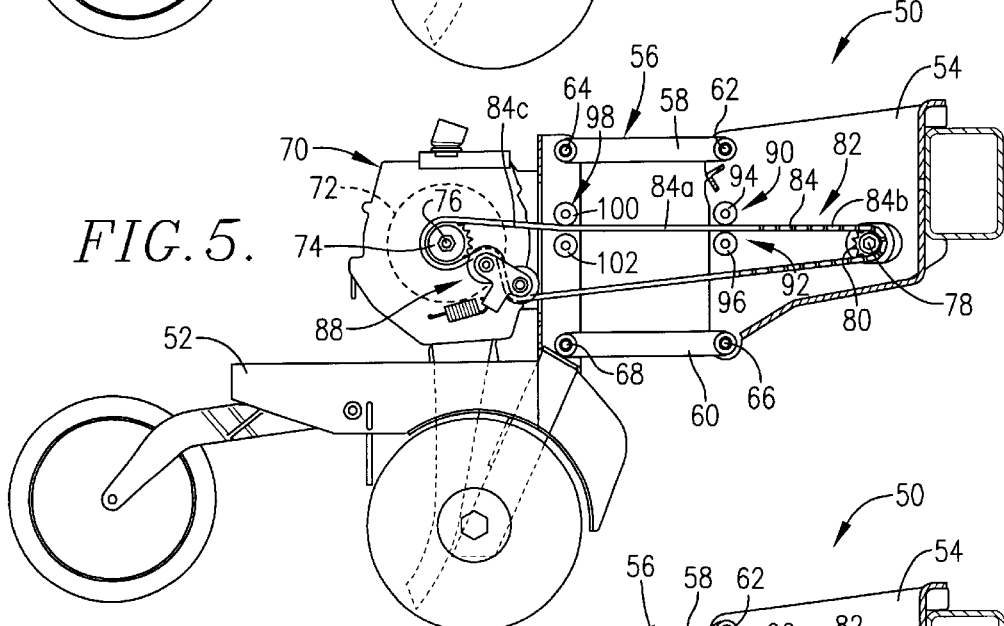
Figure 6:
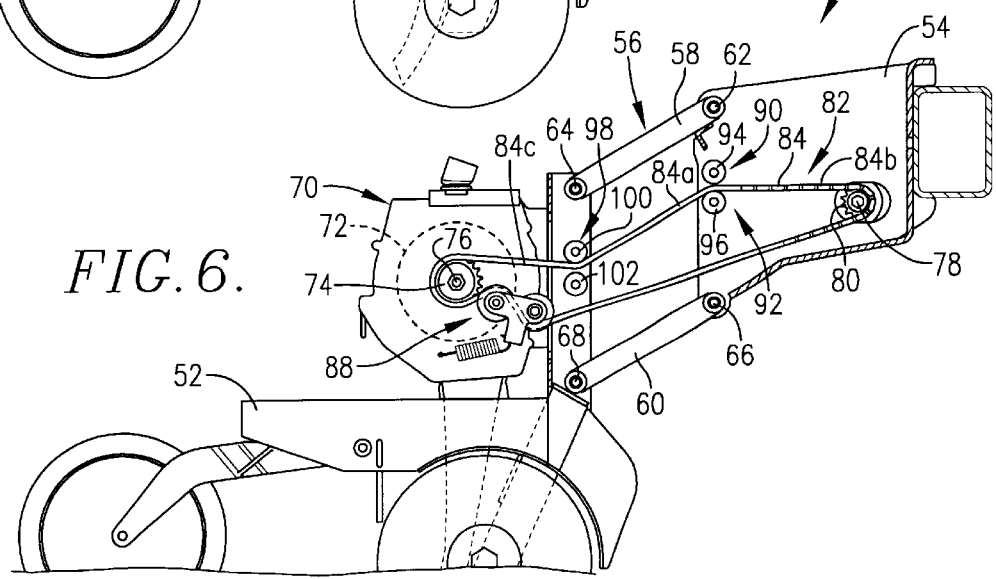

The prior art seeding machine 10 illustrated in FIGS. 1–3 has the opener 12 attached to and mounted on the main frame 14 via a parallel linkage 16. The linkage 16 includes an upper link 18 having a front pivot 20 with main frame 14 and a rear pivot 22 with opener 12. Lower link 24 extends parallel to upper link 18 and has a front pivot 26 with main frame 14 and a rear pivot 28 with opener 12. A seed metering device 30 mounted on opener 12 has an internal metering wheel (not shown) fixed to an external driven sprocket 32 that rotates about an axis 34 during operation. Driven sprocket 32 receives its power from a transverse drive shaft 36 on main frame 14, to which is affixed a drive sprocket 38. An endless, flexible drive chain 40 is trained around drive sprocket 38 and driven sprocket 32 to transfer driving power from shaft 36 to the metering wheel. Shaft 36 rotates in a clockwise direction viewing FIGS. 1–3 so that chain 40 presents an upper driving or tight stretch 42 and a lower slack stretch 44, such slack being taken up by a spring-loaded slack take-up assembly 46 on metering device 30.

FIG. 2 illustrates the prior art machine with the opener at the mid point of its range of travel in which the upper and lower links 18,24 are generally parallel to the ground. It will be seen that in this position the distance between the drive axis 36 and the driven axis 34 is at its greatest. In the raised position of FIG. 1 and the lowered position of FIG. 3 the driven axis 34 has actually moved closer to the drive axis 36 due to the nature of the parallel linkage 16 and the fact that the drive axis 36 is offset from the pivots 20,26. Consequently, as the opener moves away from its middle position of FIG. 2, the length of tight stretch 42 of chain 40 decreases slightly with the extra slack being taken up by the slack take-up assembly 46. Although the driven sprocket 32 is rotating at this time, as is the drive sprocket 38, such shortening of tight stretch 42 has the effect of momentarily slightly retarding driven sprocket 32. This momentarily decreases the frequency of seed drop, which increases seed spacing between a few seeds due to the fact that the ground speed of the machine has stayed the same.

On the other hand, as the opener swings back toward the middle position, driven axis 34 of the metering wheel moves slightly farther away from drive axis 36, causing the tight stretch 42 to lengthen slightly. This results in a momentary acceleration of the metering wheel, which in turn momentarily increases the frequency of seed drop which decreases the spacing between a few seeds as the ground speed of the machine remains constant. Inasmuch as the opener is constantly responding to changes in ground contour, seed spacing can become quite irregular.

FIGS. 4–8 depict a seeding machine 50 incorporating one preferred embodiment of the present invention. Machine 50 is similar in many respects to the machine 10 depicted in FIGS. 1–3 and the machine disclosed in prior co-pending application Ser. No. 09/475,866 filed Dec. 30, 1999, now U.S. Pat. No. 6,308,645. The disclosure of such prior application is hereby incorporated by reference into the present specification.

Like the machine 10, machine 50 includes an opener 52 swingably supported on the main frame 54 by parallel linkage 56 comprising upper link 58 and lower link 60. Upper link 58 has a front pivot 62 with main frame 54 and a rear pivot 64 with opener 52, while lower link 60 has a front pivot 66 with main frame 54 and a rear pivot 68 with opener 52. Links 58 and 60 are parallel to one another at all times. A metering device 70 mounted on opener 52 has an internal metering wheel 72 fixed to an external driven member in the nature of a sprocket 74 for rotation about an axis 76. The horizontal drive shaft 78 on mainframe 54 presents an axis of rotation for a drive member in the nature of a sprocket 80 fixed to shaft 78. An endless flexible drive element in the nature of a chain 82 is trained about drive sprocket 80 and driven sprocket 74 for transferring driving power from drive shaft 78 to metering wheel 72. Drive sprocket 80 rotates in a clockwise direction viewing FIGS. 4–6 so as to produce an upper driving or tight stretch 84 of chain 82 and a lower slack stretch 86. Slack in stretch 86 is taken up by a slack take-up assembly 88 on the metering device 70.

Guide structure generally denoted by the numeral 90 engages tight stretch 84 at strategic locations along its length so as to maintain the overall length of tight stretch 84 substantially constant throughout the full range of motion of opener 52. To this end, a first guide 92 comprising a pair of vertically spaced upper and lower rollers 94 and 96 respectively is located on the main frame 54 in vertical alignment with upper pivot 62 and lower pivot 66. A second guide 98 comprising a pair of vertically spaced upper and lower rollers 100 and 102 is located on the opener 52 in vertical alignment with upper pivot 64 and lower pivot 68. Guides 92 and 98 are generally located at the same distance below their respective upper pivots 62 and 64 (although not necessarily exactly so) such that the central spanning portion 84a of tight stretch 84 extends at least generally, and preferably substantially, parallel to upper and lower links 58,60.

As shown in FIGS. 7 and 8, tight stretch 84 of chain 82 is trapped between upper and lower rollers 94,96 and 100,102. In a preferred embodiment, such rollers are spaced apart somewhat more than the vertical thickness chain 82 so as to minimize frictional contact between the rollers and chain 82 when opener 52 is at its mid position of FIG. 5. However, such spacing is small enough that tight stretch 54 kinks or bends around one of the rollers at guides 92 and 98 whenever opener 52 moves upwardly or downwardly even a short distance from the mid position of FIG. 5. Preferably, rollers 94,96 and 100,102 are constructed of Nylon or another synthetic resinous material and have smooth, outermost, cylindrical peripheries. Mounting pins for the rollers such as the mounting bolt 104 for roller 100 in FIG. 7 and 8 allow the rollers to free-wheel.

It will be noted that the tight stretch 84 of chain 82 is effectively divided into three portions by the guides 92 and 98. As above noted, the portion 84a that spans frame 54 and opener 52 is located between guides 92 and 98. A second portion 84b is located between drive sprocket 80 and guide 92. A third portion 84c is defined between guide 98 and driven sprocket 74. Because drive sprocket 80 and guide 90 are both mounted on main frame 54 and are fixed in their relationship to one another, portion 84b does not change in length as opener 52 moves up and down during field operations. Likewise, driven sprocket 74 and guide 98 are both mounted on opener 52 and do not move relative to one another in a positional sense as the opener moves up and down. Consequently, portion 84c also experiences no change in length during field operations. While guide 98 moves up and down relative to guide 92, it travels in an arc about a point located at guide 92, the radius of such arc being portion 84a. Because the line of centers between guides 92 and 98 is effectively substantially parallel to links 58 and 60 of parallel linkage 56, and because the portion 84a is substantially the same length as links 58 and 60, the length of portion 84a remains unchanged, or at least substantially so, throughout all positions of up and down travel of opener 52. Thus, the overall length of tight stretch 84a remains substantially unchanged also. This keeps metering wheel 72 from experiencing significant momentary accelerations and decelerations, leading to more uniform seed spacing in the furrow.

ALTERNATIVE EMBODIMENT

FIG. 9 illustrates an alternative embodiment of the present invention in connection with a machine 108 having an opener 110 that is secured to main frame 112 through a single pivot point rather than a parallel linkage as in the first embodiment. Transverse pivot 114, shown in phantom lines in FIG. 9, provides the means by which opener 110 is joined to the main frame 112. Drive shaft 116 and drive sprocket 118 are laterally offset from pivot 114 such that tight stretch 120 of chain 122 has a tendency to increase and decrease in length as opener 110 experiences terrain changes relative to main frame 112. However, by locating guide 124 in the immediate vicinity of pivot 114, the spanning portion 120a between guide 124 and driven sprocket 126 on driven shaft 128 (as well as the entire tight stretch 120) remains substantially the same length throughout all positions of opener 110. Consequently, even with the single point mounting arrangement of FIG. 9, momentary accelerations and decelerations of the metering wheel 130 within metering device 132 can be substantially avoided.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In a seeder including a mobile frame and at least one opener coupled with the frame in a manner that permits the opener to move up and down and fore and aft relative to the frame during seeding operations as changes in ground contour are encountered, the improvement comprising:

a drive member on the frame rotatable about a first axis;

a driven member on the opener rotatable about a second axis, the distance between said first and second axes changing as the opener experiences said relative movement;

a seed metering device on the opener, said metering device including a metering wheel that dispenses seeds as it rotates, said metering wheel being operably coupled with said driven member;

an endless flexible drive element looped around said drive member and the driven member for transferring driving power from the drive member to the metering wheel, said drive element having a first stretch moving generally from the driven member to the drive member and a second stretch moving generally from the drive member to the driven member; and guide structure engaging said first stretch in a manner that keeps the length of the first stretch substantially constant during said relative movement of the opener despite said changing distance between said axes.

2. In a seeder as claimed in claim 1, said driven member being coaxially fixed to said metering wheel.

3. In a seeder as claimed in claim 1, said members comprising toothed sprockets, said drive element comprising a chain.

4. In a seeder as claimed in claim 1, said guide structure including at least one rotatable idler.

5. In a seeder as claimed in claim 4, said at least one rotatable idler comprising a roller having a smooth outer periphery disposed for engagement with said drive element.

6. In a seeder as claimed in claim 1, said opener being coupled with the frame via parallel linkage that includes a pair of parallel links extending between the frame and the opener, said guide structure including a first guide on said frame and a second guide on said opener, said first and second guides being so located that the portion of said first stretch extending between said first and second guides extends generally parallel to said links.

7. In a seeder as claimed in claim 6, each of said guides comprising a pair of spaced rollers trapping the drive element therebetween.

8. In a seeder as claimed in claim 7, said driven member being coaxially fixed to said metering wheel.

9. In a seeder as claimed in claim 8, said members comprising toothed sprockets, said drive element comprising a chain.

10. In a seeder as claimed in claim 1, said opener being swingably coupled with the frame via a single pivot, said guide structure including a guide in close proximity to said pivot that keeps the portion of said first stretch extending between the pivot and said driven member parallel to an imaginary line of centers between the pivot and said second axis.

11. In a seeder as claimed in claim 10, said guide comprising a pair of spaced rollers trapping the drive element therebetween.

12. In a seeder as claimed in claim 11, said driven member being coaxially fixed to said metering wheel.

13. In a seeder as claimed in claim 12, said members comprising toothed sprockets, said drive element comprising a chain.

* * * * *